No. 770,914. PATENTED SEPT. 27, 1904.
T. C. MARSHALL.
RUBBER SPONGE CUP.
APPLICATION FILED FEB. 13, 1904.
NO MODEL.
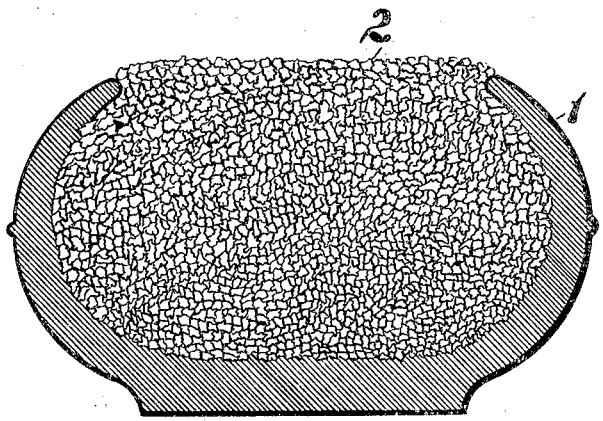
Witnesses
Inventor,
T. C. Marshall
by C. E. Humphrey
Atty.

No. 770,914. Patented September 27, 1904.

UNITED STATES PATENT OFFICE.

THOMAS C. MARSHALL, OF AKRON, OHIO.

RUBBER SPONGE-CUP.

SPECIFICATION forming part of Letters Patent No. 770,914, dated September 27, 1904.

Application filed February 13, 1904. Serial No. 193,467. (No model.)

*To all whom it may concern:*

Be it known that I, THOMAS C. MARSHALL, a citizen of the United States, residing at Akron, in the county of Summit and State of Ohio, have invented a certain new and useful Improvement in Rubber Sponge-Cups, of which the following is a complete specification.

My invention relates to sponge-cups for desk use, wherein a constantly-moistened sponge is maintained for the purposes of removing from pens the accumulated ink and other deleterious substances or for dampening the finger-tips to aid in handling paper or in counting money.

Heretofore common glass cups have been used in which ordinary sponges are placed; but their use is attended with a number of unsatisfactory results, such as the rapidity with which they dry out, the constant tendency of the sponge to tear, leaving particles in the pen, the easily breakable nature of the cup, and the fact that they do not hold the sponge firmly in position, and in addition to these facts any movement on a desk tends to scratch or mar its surface.

The objects of my invention are to manufacture a cup and sponge therefor which can be easily filled, which retains moisture an unusual length of time, is not readily torn, and is incapable of being broken and does not mar the desk or furniture on which it is placed.

To the accomplishment of the aforesaid objects my invention consists in the peculiar and novel construction, arrangement, and combination of parts hereinafter described, reference being had to the accompanying drawing, forming a part hereof.

In the drawing, which represents a vertical central section of my improved sponge-cup and sponge, 1 is an ordinary vulcanized rubber cup with a slightly-inturned top, preferably made in a mold, and within the cavity of which is placed a piece of rubber sponge 2. The cup 1 and rubber sponge 2 may be separate and independent from each other and so vulcanized; but I prefer to shape the cup 1, partially vulcanize it in a mold, and then place within its cavity, the side walls of which are by this time self-sustaining, a quantity of rubber containing a gas-generating substance, and then replace the cup thus charged in the mold and continue the vulcanization until both the cup and sponge placed within its cavity are perfectly cured. Experience has shown that where the cup is partially vulcanized and a composition capable of producing sponge-rubber is placed within its cavity the heat necessary to complete the final vulcanization of the cup is about what is necessary to perfectly vulcanize the sponge rubber and cause it to raise like bread and fill the cavity of the cup and slightly project therefrom, in doing which it will adhere to the sides of the cup by reason of the fact that the cup is only partially cured at the time of the insertion of the sponge-rubber. Of course it is entirely obvious that the cup may be cured by itself as an independent article, and after its completion its cavity may be filled with a piece of rubber sponge of a suitable size, thus making the cup and sponge separate articles. Thus I produce an elastic waterproof sponge-cup which will retain dampness longer than the ordinary sponge-cup, will not break if dropped from a desk, and will not mar it if pushed across its surface, and the sponge will not readily tear or leave particles in the pen.

I find in filling the sponge with water the easiest way is to invert the cup and insert its top in a body of water and release the pressure upon the cup, which by its resiliency will fill the sponge sufficiently full of water to last a long time.

What I claim is—

As a new article of manufacture a sponge-cup consisting of an open elastic cup of rubber, the cavity of which is filled with a body of sponge-rubber united to said cup and forming an integral article.

In testimony that I claim the above I hereunto set my hand in the presence of two subscribing witnesses.

THOMAS C. MARSHALL.

In presence of—
C. E. HUMPHREY,
F. H. STUART.